Nov. 2, 1965    R. F. SWENSON    3,215,386
PNEUMATIC SEAT SUPPORT
Filed April 10, 1964    2 Sheets-Sheet 1
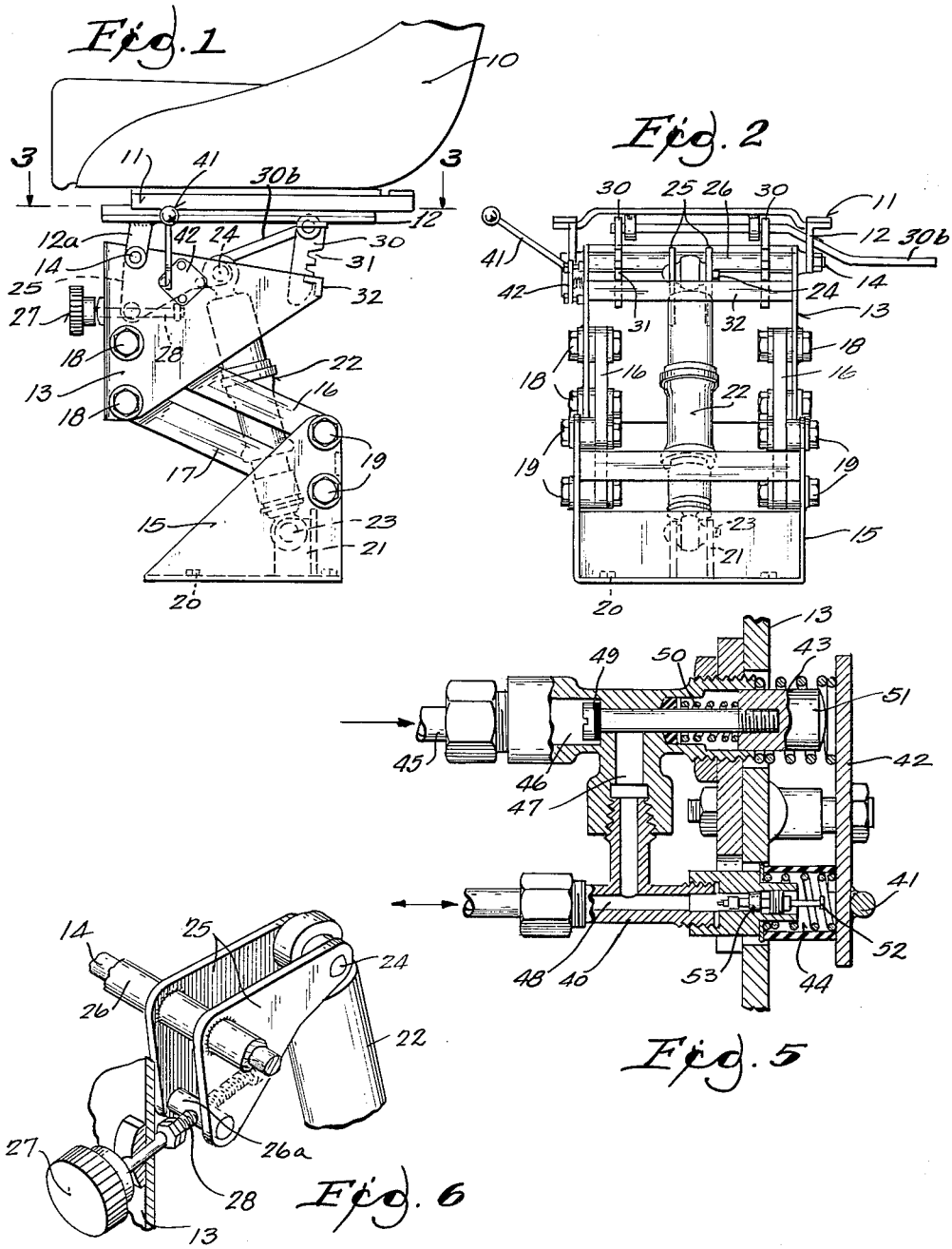
INVENTOR.
RICHARD F. SWENSON
BY
Lieber & Nilles
ATTORNEYS

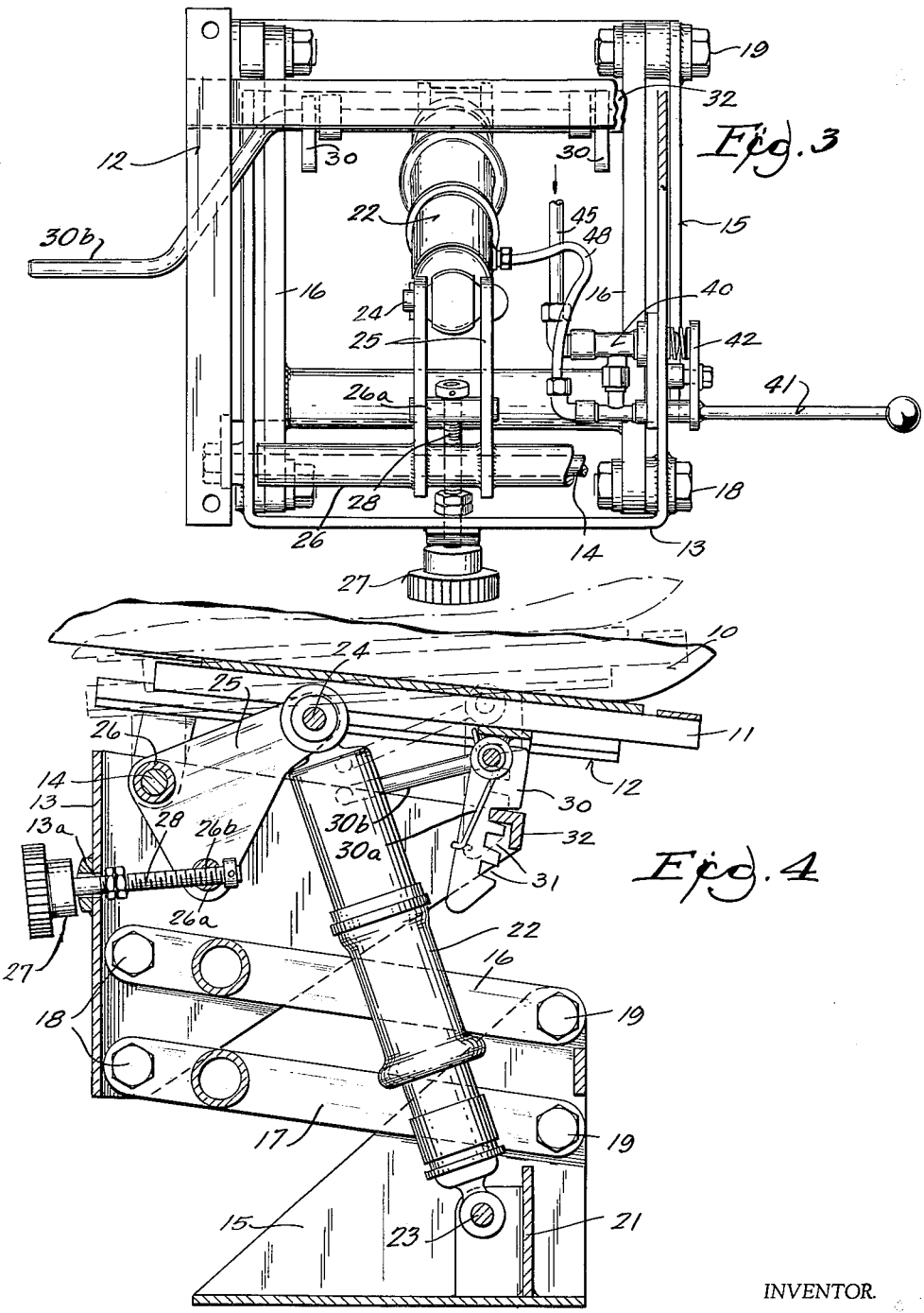

United States Patent Office 3,215,386
Patented Nov. 2, 1965

3,215,386
PNEUMATIC SEAT SUPPORT
Richard F. Swenson, Milwaukee, Wis., assignor to Milsco Manufacturing Co., Milwaukee, Wis., a corporation of Wisconsin
Filed Apr. 10, 1964, Ser. No. 358,813
7 Claims. (Cl. 248—400)

This invention relates to a seat support for vehicles and the like, and relates more particularly to a pneumatic support for a vehicle seat adapted to cushion road shocks and other vehicular vibrations with the support also being readily adjustable.

A primary object of this invention is to provide an improved pneumatic support for a seat whereby facile adjustment as to operator comfort is provided.

Numerous seating devices have been heretofore proposed for providing a comfortable seating means for vehicles such as tractors, cross-country riding devices, on-and-off highway equipment and the like. One prior pneumatic seat is disclosed in Decker U.S. Patent No. 2,760,552 wherein a seat is supported on a fluid cylinder and wherein the base portion of the support serves as a wherein the base portion of the support serves as a fluid chamber for the cylinder for isolating the seat from the vehicular shock and vibration ordinarily encountered during operation of the vehicle. This prior patent furthermore discloses a means for dampening the fluid cylinder movement to prevent over-and-under compensation in response to the shocks and vibrations. However, the structure disclosed in such patent is complex and would be difficult to repair and maintain in adjustment on vehicles which are ordinarily operated considerable distances from normal service facilities.

It is, therefore, another object of the invention to provide an improved pneumatic seat support device that overcomes the above disadvantages of the prior art structure.

It is another object of the invention to provide an improved supporting frame structure for a pneumatic seat device wherein a simple adjustment is provided for changing the cushioning characteristics of the seat It is a further object of the invention to provide an improved pneumatic means for supporting a seat in conjunction with a supporting frame having a simple parallelogram linkage for interconnecting parts of the frame.

It is another object of the invention to provide a simple and efficient means associated with a pneumatic seat supporting device for effectively adjusting the seat regardless of the weight of the person occupying the seat.

It is another object of the invention to provide a fluid cushioned seat support device of simple construction and one which allows ease of repair.

It is a still further object of the invention to provide a seat support device for vehicles wherein support adjustments may be made in accordance with passenger weight and height of seat relative to the seat support.

Other objects and advantages pertaining to the specific construction, operation, and arrangement of the parts of the pneumatic seat supporting device will more fully appear from the following description taken in conjunction with the accompanying drawings:

FIGURE 1 is a side elevational view of the pneumatic seat supporting device embodying the invention;

FIGURE 2 is a rear elevational view of the improved seat support;

FIGURE 3 is a plan view of the pneumatic seat support structure taken along line 3—3 of FIGURE 1;

FIGURE 4 is an enlarged part-sectional elevational view similar to that of FIGURE 1 showing the details of the invention more clearly;

FIGURE 5 is an enlarged fragmentary plan view in partial section taken transversely through the control valve; and FIGURE 6 is a perspective view of the adjustment device shown in FIGURE 4.

While the improvements have been illustrated and described as being especially advantageously embodied in a pneumatic seat support device for tractors and the like, it is not intended to thereby unnecessarily limit or restrict the invention since the improved seat may be used to like advantage in other environments. It is also contemplated that certain descriptive terminology used herein shall be given the broadest possible interpretation consistent with the disclosure.

Referring now to the drawings, a seat 10 carried by rails 11 or the like is attached to a tiltable seat support member 12 for movement forwardly or rearwardly to different fore and aft positions of adjustment. The member 12 is pivotally attached to an upper frame member 13 at pivots 14, the frame member 13 thus providing a seat support. The upper frame member 13 is interconnected to a lower frame member or base 15 by a parallelogram linkage comprising two pairs of links 16 and 17 pivotally attached to the upper and lower frame members as at pivots 18 and 19 respectively. The lower frame member 15 is secured to the floor of a vehicle or the like as by fasteners 20. Also mounted on the lower frame member 15 is a fluid cylinder support member 21 for pivotally supporting a fluid cylinder 22 at the lower end thereof as by a pivot pin 23. At the upper end of fluid cylinder 22 a pivot pin 24 pivotally attaches the fluid cylinder to a pair of adjustment plates 25 that are secured to a tube 26 coaxially extensive with and fully rotatable on longitudinally extending pivot pin 14. The fluid cylinder 22 is normally subjected to fluid pressure from a compressor (not shown) carried by the vehicle. The fluid cylinder 22, when subjected to fluid pressure, is normally in a fully extended position between the upper and lower frame members 13 and 15. The amount of fluid pressure within the cylinder 22 will determine the amount of cushioning available between seat 10 and the lower frame member 15. Fluid cylinders are well known and need not be described in greater detail.

With the cylinder 22 in its normally extended position, the upper frame member 13 is supported by said cylinder where it joins the pivot plates 25 that are affixed to the tube 26. The upper frame member 13 is also supported by the parallel links 16 and 17 as pivotally secured to the lower frame member 15.

The pivot plates 25 are substantially parallel as best seen in FIG. 3 and are secured to the cylindrical tube 26 as by welding. The upper end of the fluid cylinder 22 extends within the plates where the cylinder is pivotally connected to the plates by the pivot pin 14. The pivot plates 25 are also joined together at their lower portion by a pivotal web member 26a provided with a threaded opening 26b. An adjustment device 27 having a threaded shank 28 is received in an opening 13a in upper frame member 13 whereby the threaded shank 28 threadably engages threaded opening 26b of web member 26a.

Thus in effect the pivot plates 25 each constitute a triangular member having a fluid cylinder pivotally attached at one apex thereof, a tube 26 secured at another apex of the triangle, and a web member at the third apex. The upper frame member 13 is supported by the pivot shaft 14 which extends through tube 26, and as the threaded shank 28 turns the web member 26a the pivot plates pivot around pin 14 at the end of fluid cylinder 22 to raise or lower upper frame member 13 relative to lower frame member 15, and in a path determined by the parallelogram linkage 16 and 17.

If it is desired to raise or lower the seat 10 relative to the vehicle floor, the adjustment device 27 is turned to pivot the pivot plates 25 about pin 14 to raise or lower upper frame member 13 relative to lower frame member 15.

Further, if it is desired, to tilt the seat 10 with respect to the upper frame member 13, the seat support member 12 is provided with a notched member 30 having notches 31 for engagement with a cross bar 32. The member 30 is resiliently urged as by spring 30a (FIG. 4) toward cross bar 32 and the engagement of the cross bar by a preselected notch determines the degree of tilt of seat 10 as illustrated by the dotted lines in FIG. 4.

A fluid control valve 40 is mounted on upper frame member 13 for controlling the fluid pressure to the fluid cylinder 22 and the escape of fluid pressure therefrom. The amount of fluid pressure in the cylinder determines the cushioning effecting between frame member 13 and frame member 15 and is controlled by valve operating handle 41. The handle 41 is secured to a valve plate 42 engageable with fluid pressure control valves 43 and 44. A source of fluid pressure is communicated to control valve 40 from a compressor (not shown) through a conduit 45 to control a valve chamber 46 and is thence communicated to the fluid cylinder 22 via fluid passages 47 and 48. The fluid chamber 46 is normally closed by the seating of valve 49 as by the urging of a spring 50. When it is desired to admit fluid from chamber 46 to the cylinder 22 and thereby increase the fluid pressure in the cylinder, the operating handle 41 is moved to depress valve plate 42 against valve plug 51 to overcome the urging of spring 50 to open valve 49 to allow the fluid pressure to be communicated to cylinder 22. This addition of fluid pressure to the cylinder 22 increases the fluid pressure therein thus providing a less resilient relation between the frame member 13 supporting the seat 10 and lower frame member 15 thereby in effect producing a "harder" ride for an operator occupying the seat 10.

For producing a "softer" ride, the operating handle 41 is moved to position valve plate 42 against valve stem 52 of fluid pressure relief valve 53 thereby allowing the fluid pressure in cylinder 22 to escape through passage 48 and out through valve 53 to reduce the fluid pressure within cylinder 22.

In operation, an operator occupies the seat 10 and determines whether or not the seat is at the proper distance from the floor of the vehicle. If he desires to change the height of the seat from the floor, he turns adjustment device 27 to raise or lower upper frame member 13 as hereinabove described. If the tilt of the seat 10 is to be changed, the operator changes the position of notched member 30 relative to cross bar 32 by means of an actuating handle 30b to change the tilt angle of the frame 12 about pivot 14. As shown, the shaft of the handle 30b is pivotally supported and carries the members 30. Thus, by pulling the handle upwardly, the notched members 30 are disengaged and the seat released for forward tilting and pivoting, and when the seat is returned, the notched members 30 automatically catch and lock the seat against tilting. To change the cushioning effect of the seat as the vehicle moves along, the operator changes the fluid pressure in the cylinder 22 by operation of handle 41 as hereinabove described to produce either a "harder" or a "softer" ride.

Thus, a support for a vehicle seat has been provided in which the fore and aft position, the height of the seat, the tilt of the seat, and the cushioning action of the seat can be readily varied in accordance with the desires of an operator. All of the controls can be conveniently located so as to be accessible for expedient adjustment and readjustment as necessitated by diverse operating conditions, and the pneumatic support in effect provides a variable spring which renders precisely the type of "ride" desired by different operators. By manipulation of the lever 41, the cylinder 22 is supplied with a greater or lesser amount of elastic fluid from any suitable, available source such as the compression system of the vehicle or an auxiliary compressor, and the hardness or softness of the "ride" is accordingly varied. While a particular type of control utilizing lever 41 has been shown and described herein, the control means could obviously be modified in various ways, as by the substitution of push buttons or the like for the operating lever. Also, it should be noted that even without the control valving a pneumatic seat support is provided in which a predetermined amount of air can be introduced at the factory; and even if the control valving in the device shown and described herein should fail, the air trapped in the system causes the seat to maintain the position and rideability.

Various modes of carrying out the invention are contemplated as being within the scope of the following claims particularly pointing out and distinctly claiming the subject matter which is regarded as the invention.

I claim:

1. A vehicle seat assemblage comprising, a lower frame member, an upper frame member, upper and lower links each pivotally secured at one end to said lower frame member and at the other end to said upper frame member in parallel relationship to provide a parallelogram support permitting vertical movement of said upper frame member relative to said lower frame member, an air cylinder pivotally secured at one end to said lower frame member and extending upwardly intermediate the pivotally supported ends of said upper and lower links, a seat mounted on said upper frame member for movement therewith, linkage means pivotally connected at spaced points between said upper frame member and the upper end of said cylinder, and adjustment means coacting with said linkage to swing the same about its pivotal connection with said cylinder and thereby move said seat to different positions of vertical adjustment.

2. A vehicle seat assemblage according to claim 1, wherein the linkage means pivotally connecting the upper frame member and the cylinder includes an adjustment member mounted in said upper frame member for effecting the adjustments in the position of said seat.

3. A vehicle seat assemblage according to claim 1, wherein means are provided for regulating the quantity of air in the air cylinder to vary the cushioning effect thereof.

4. A vehicle seat assemblage according to claim 1, wherein the pivots securing the upper and lower links to the lower frame member are vertically aligned at the rear of said lower member, and the pivots securing said links to the upper frame member are vertically aligned at the forward end of said upper member.

5. A vehicle seat assemblage comprising, a lower frame member providing a base, an upper frame member providing a seat support, upper and lower links each pivotally secured at one end to said base and at the other end to said seat support in parallel relationship to provide a parallelogram support permitting vertical movement of said seat support relative to said base, an air cylinder pivotally secured at one end to said base and extending upwardly between the pivotally supported ends of said links and toward the front of said seat support, a seat mounted for tiltable adjustment on said seat support, and means pivotally connected at spaced points between said seat support and the upper end of said cylinder adjacent the front of said seat for moving said seat to different positions of vertical adjustment independently of the tiltable adjustment therefor.

6. A vehicle seat assemblage according to claim 5, wherein the adjustable mounting for tilting the seat includes a flange-forming element on the rear portion of the seat support and a notched member on the seat resiliently urged toward engagement with said flange-forming element.

7. A vehicle seat assemblage according to claim 6, wherein the notched member is pivotally supported on the seat and means are provided for swinging the same way from the flange-forming member to effect adjustments.

References Cited by the Examiner
UNITED STATES PATENTS

| | | | |
|---|---|---|---|
| 1,588,659 | 6/26 | Christensen | 91—457 |
| 2,087,253 | 7/37 | Herold | 248—378 |
| 2,462,815 | 2/49 | Sedgwick | 91—457 |
| 2,527,905 | 10/50 | Barecki | 248—421 |
| 2,531,572 | 11/50 | Knoedler | 248—400 |
| 2,652,880 | 9/53 | Gundersen | 248—378 |
| 2,641,247 | 6/53 | Genebach | 248—421 |
| 2,714,001 | 7/55 | Hersey et al. | 248—400 |
| 2,821,239 | 1/58 | Brendel | 248—400 |
| 2,829,703 | 4/58 | Knoedler | 248—400 |
| 2,840,140 | 6/58 | Harrington | 248—400 |
| 3,075,736 | 1/63 | Freedman | 248—400 |

FOREIGN PATENTS 498,093  12/53  Canada.

CLAUDE A. LE ROY, *Primary Examiner.*